P. H. SCHABACKER & P. H. SMITH.
CANDY MACHINE.
APPLICATION FILED OCT. 11, 1911.
1,052,519.
Patented Feb. 11, 1913.
4 SHEETS—SHEET 1.
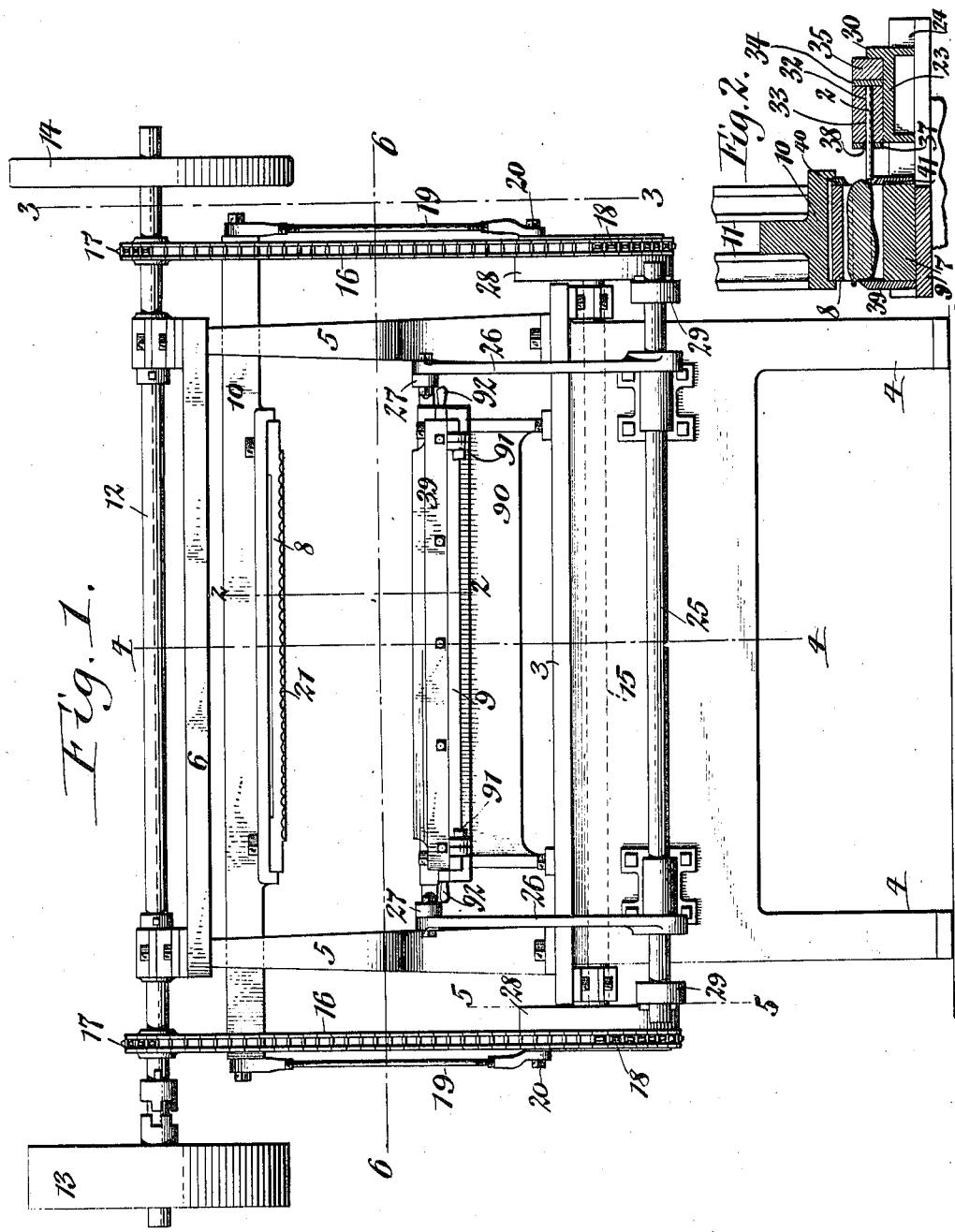

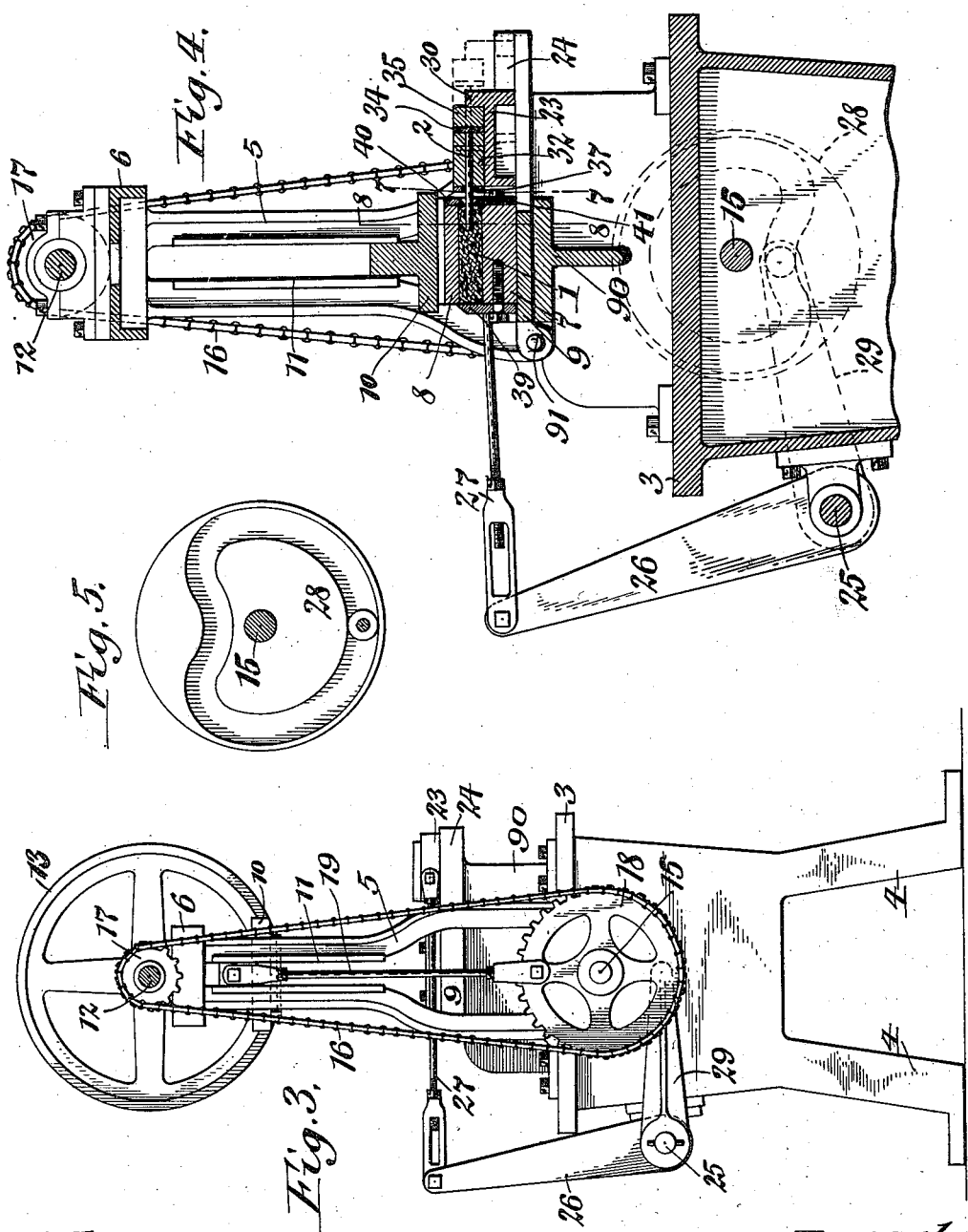

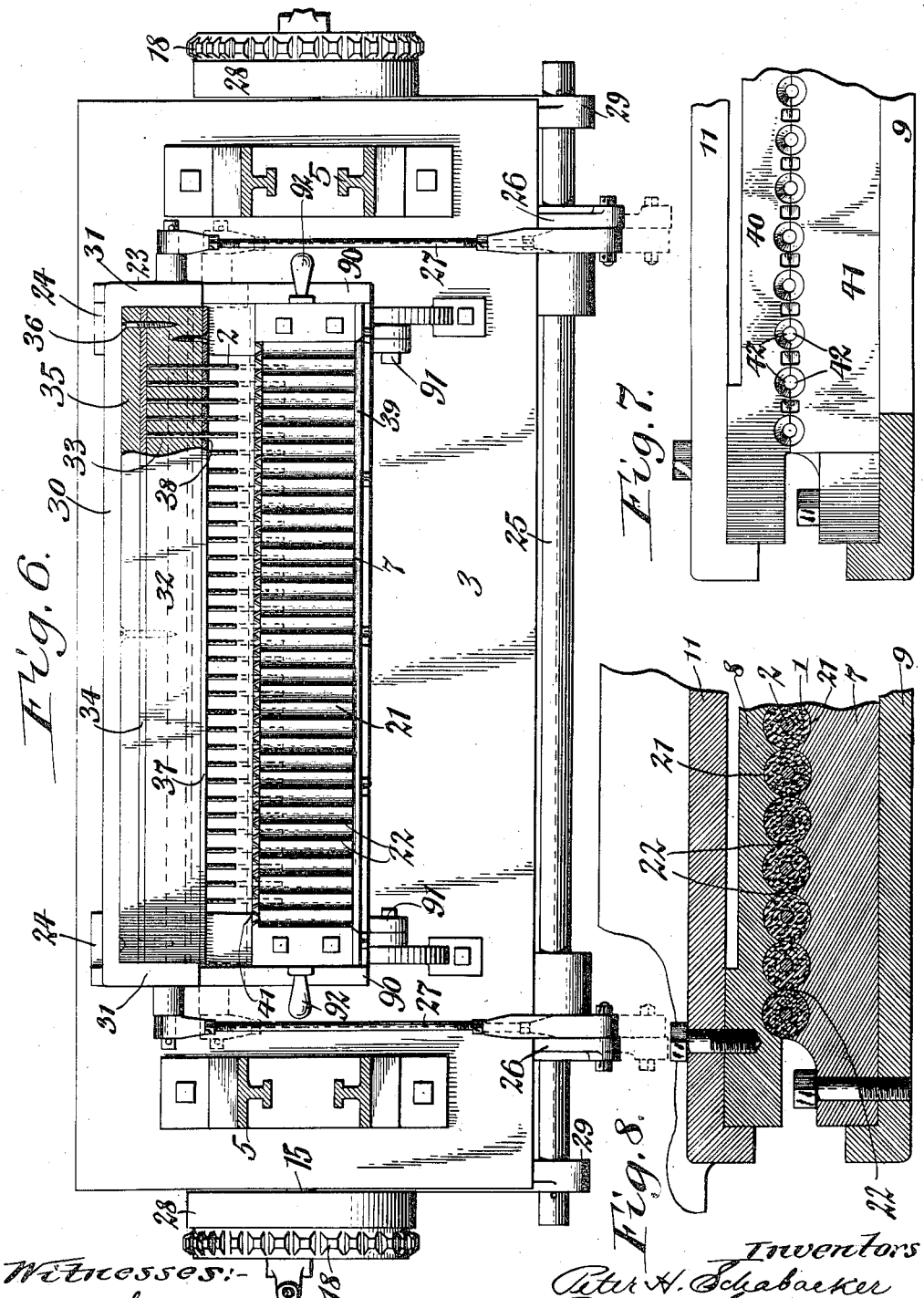

P. H. SCHABACKER & P. H. SMITH.
CANDY MACHINE.
APPLICATION FILED OCT. 11, 1911.
1,052,519.
Patented Feb. 11, 1913.
4 SHEETS—SHEET 4.
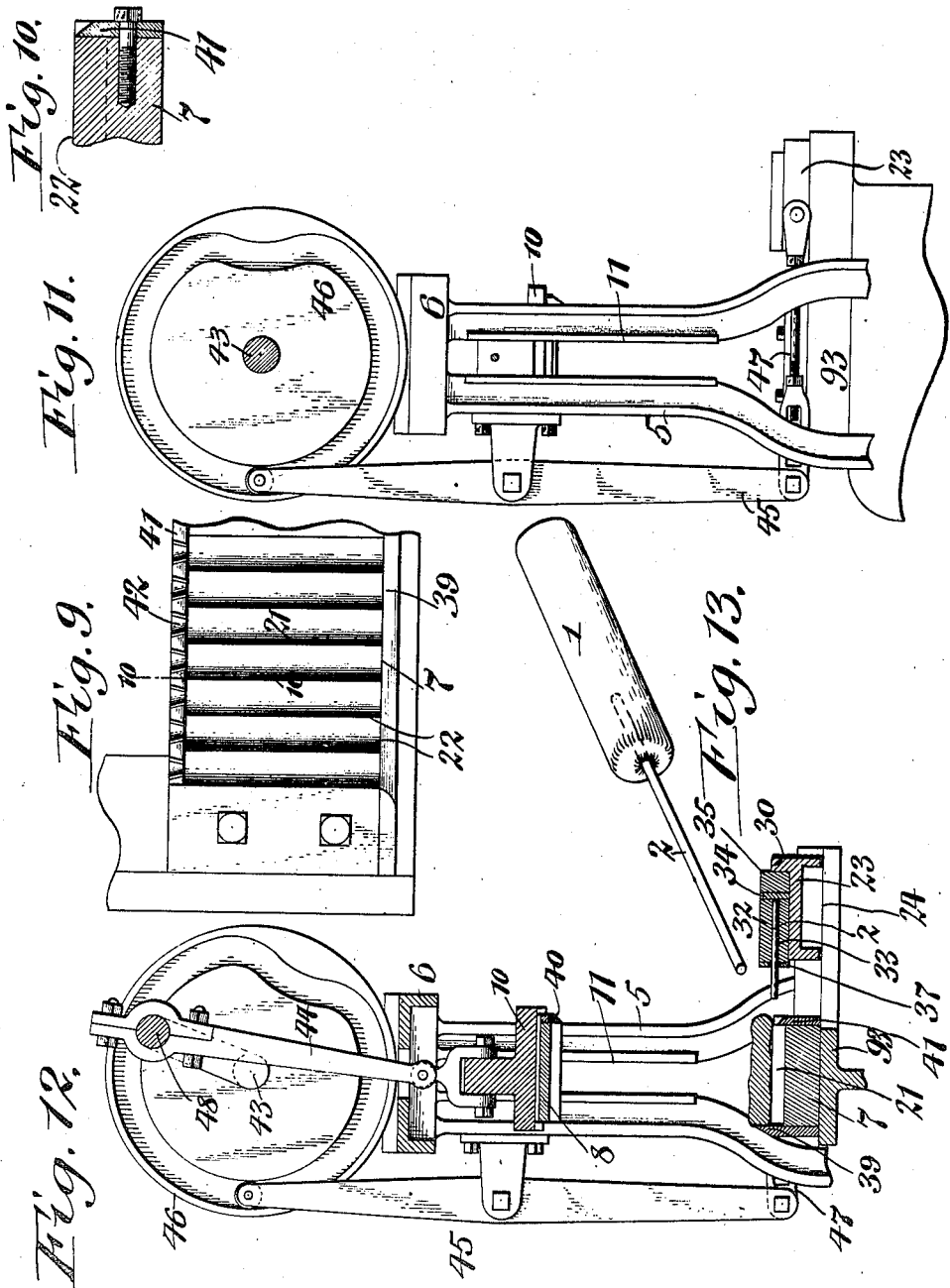

UNITED STATES PATENT OFFICE.

PETER H. SCHABACKER AND PETER H. SMITH, OF BUFFALO, NEW YORK.

CANDY-MACHINE.

1,052,519.

Specification of Letters Patent. Patented Feb. 11, 1913.

Application filed October 11, 1911. Serial No. 654,100.

*To all whom it may concern:*

Be it known that we, PETER H. SCHABACKER and PETER H. SMITH, citizens of the United States, residing at Buffalo, in the county of Erie and State of New York, have invented new and useful Improvements in Candy-Machines, of which the following is a specification.

This invention relates to a candy making machine and more particularly to a machine which applies a stick or skewer to a piece of candy which stick serves as a handle for holding the piece of candy and enables the same to be eaten without getting the fingers sticky. The machine may, however, also be used for making candy without skewers.

It is the object of this invention to produce a simple, reliable and durable machine whereby pieces of candy may be formed and skewers applied to the individual pieces of candy rapidly, conveniently, uniformly and at comparatively low cost.

In the accompanying drawings consisting of 4 sheets: Figure 1 is a front elevation of the candy machine embodying our invention and showing the upper platen and mold section in an elevated or inoperative position. Fig. 2 is a fragmentary vertical cross section in line 2—2, Fig. 1, showing the mold sections nearly closed and a skewer about to be inserted in a piece of candy arranged between the mold sections. Fig. 3 is a vertical transverse section in line 3—3, Fig. 1. Fig. 4 is a fragmentary vertical transverse section, on an enlarged scale, taken in line 4—4, Fig. 1, but showing the mold sections closed upon a mass of candy and a skewer inserted in the same. Fig. 5 is a vertical transverse section in line 5—5, Fig. 1. Fig. 6 is a horizontal section, on an enlarged scale, taken in line 6—6, Fig. 1. Figs. 7 and 8 are fragmentary vertical transverse sections, on an enlarged scale, in the correspondingly numbered lines in Fig. 4. Fig. 9 is a fragmentary top plan view of the lower section of the mold and adjacent parts. Fig. 10 is a fragmentary vertical transverse section, in line 10—10, Fig. 9. Fig. 11 is a side elevation, partly in section, showing a modification of our invention. Fig. 12 is a vertical transverse section of the same. Fig. 13 is a perspective view of one of the finished pieces of candy and a skewer inserted in the same by means of our machine.

Similar characters of reference indicate corresponding parts throughout the several views.

This machine is designed to mold into shape pieces of candy and insert into each piece a skewer whereby each piece of candy may be held in the hand while the candy is being eaten and thereby prevent the hands or fingers from becoming sticky.

Although the machine may be constructed so as to give the piece of candy various forms in its finished condition the present machine is designed to produce pieces of candy of cylindrical form, as shown at 1, in Figs. 8 and 13, and to insert a skewer 2 into one end of the cylindrical piece of candy, as shown in Figs. 4 and 13. This skewer is preferably constructed of wood in the form of a cylindrical rod or stick but if desired the same may be constructed in any other suitable form and of any other suitable material.

The main frame of the machine which supports the working parts may be variously constructed but as shown in the drawings the same preferably comprises a horizontal table 3 provided on its underside with supporting legs 4, two standards 5, 5 rising from opposite ends of the table, and a horizontal longitudinal head 6 connecting the upper ends of the standards.

The mold whereby the pieces of candy are formed is preferably constructed in two sections which are relatively movable for opening and closing the mold. The preferred construction of mold comprises a lower stationary section or die 7 and a vertically movable upper section or die 8 which rises and falls relatively to the lowermost section. The lower mold section is mounted on a lower relatively stationary platen 9 which normally rests in a horizontal position on a bench 90 mounted on the table. At its front end the lower platen is preferably connected with the front edge of the bench by hinges 91 so that the lower die may be swung forwardly or backwardly by means of handles 92 at opposite ends thereof for reversing the lower die and emptying the same as will be hereinafter more fully described. The upper mold section is mounted on a platen 10 which is guided in vertical ways 11 on the upper parts of the standards.

Although various means may be employed for raising and lowering the uppermost section the means for this purpose shown in Figs. 1 and 3 comprise a horizontal longitudinal driving shaft 12 journaled in bearings on top of the upper head 6 and provided at one end with a driving pulley 13 and at its opposite end with a balance wheel 14, a counter shaft 15 journaled horizontally and lengthwise in bearings on the underside of the table, chain belts 16 arranged at opposite ends of the machine and each passing at its upper turn around a sprocket pinion 17 of the driving shaft and a sprocket wheel 18 secured to the corresponding end of the counter shaft, and two pitmen or connecting rods 19 each pivotally connected at its upper end with one end of the vertically movable platen 10 while its lower end is pivotally connected with a crank pin 20 on the outer side of the sprocket wheel on the adjacent end of the counter shaft.

The opposing sides or surfaces of the mold sections are preferably constructed to form between them a longitudinal row of mold cavities which may be of any suitable shape. Those shown in the drawings are of cylindrical form and have their axes arranged horizontally and transversely relatively to the machine as a whole. For this purpose each of the mold sections is preferably provided with a plurality of semi-cylindrical mold cavities 21 each of which is in line with a corresponding mold cavity of the other mold section so that when the two mold sections are closed a plurality of cylindrical mold cavities are produced which are arranged close together and form sharp longitudinal cutting edges 22 between every two adjacent mold cavities of each mold section. It follows from this construction that upon placing a mass of plastic candy lengthwise between the two mold sections and then closing these sections this mass of candy will be pressed or molded into a plurality of cylindrical pieces by the complementary semi-cylindrical cavities of the sections and the several pieces of candy will be severed from each other by reason of the cutting edges 22 of one mold section engaging with the transverse cutting edges of the other mold section.

As the mass of dough is gripped between the opposing faces of the mold section and is completing the molding and severing of the same into a plurality of individual pieces a plurality of skewers may be applied to these pieces, one skewer being pushed lengthwise at one of its ends into one end of one of the pieces of candy. The preferred means which are shown in the drawings for inserting the skewers into the pieces of candy are constructed as follows: 23 represents a horizontal slide or carrier arranged lengthwise in rear of the mold sections and movable horizontally and transversely relatively thereto. This slide is guided on ways 24 which preferably project rearwardly from the bench 90 of the lower platen. This slide may be reciprocated by any suitable means, for instance by the means which are shown in Figs. 1, 3, 4, 5 and 6, and which comprise a rock shaft 25 journaled lengthwise and horizontally on the front part of the main frame below the table, two upright rock arms 26 arranged near opposite ends of the rock shaft and each connected at its upper end with one end of the slide by means of a pitman or connecting rod 27, two rotatable cams 28 secured to the counter shaft adjacent to the inner sides of the sprocket wheels, and two lower horizontal rock arms 29 arranged on opposite ends of the rock shaft and each engaging with one of the cams 28. On its upper side the slide is provided with a longitudinal rib 30 along its rear longitudinal edge and two transverse ribs 31 extending forwardly from opposite ends of the longitudinal rib along opposite transverse edges of the slide, thereby forming a seat or recess on the upper side of this slide which opens upwardly and forwardly. Within this recess is arranged a skewer rack or holder which may be variously constructed but preferably comprises a wooden body 32 provided with a longitudinal row of horizontal transverse sockets 33, a metal bottom strip 34 arranged in rear of the body and closing the rear ends of the socket, and a wooden backing or filling block 35 arranged between the rear side of the bottom strip and the rear rib or wall 30 of the slide. Into each of the sockets a skewer is placed until its rear end strikes the bottom of the socket. By providing the rack with the metal bottom strip for the rear ends of the skewers to engage with, the bottoms of these sockets are more durable and permit of reliably and uniformly pushing the skewers into the pieces of candy.

The body bottom strip and backing piece of the rack may be secured by screws 36, as shown in Fig. 6 or by any other suitable means.

In order to reduce the wear upon the inlet ends or mouths of the sockets a facing strip 37 of metal is secured to the front end of the body, which facing strip is provided with a plurality of openings 38 each of which is in line with one of the sockets of the rack and preferably tapered or flared so as to facilitate the introduction of the skewers into the same. A plurality of such racks are preferably kept on hand so that while one rack containing a set of skewers is mounted on the slide preparatory to pushing a set of skewers into a series of pieces of candy other racks may be filled by the operator with skewers in readiness to be substituted for an empty rack on the slide from which the skewers have been withdrawn.

For the purpose of trimming off the surplus stock of candy from the front and rear ends of the several pieces of candy, trimming means are provided which are preferably constructed as follows: 39 represents a cutter blade secured to the lower mold section along the front edge thereof and having a continuous upper cutting edge which extends above the front ends of the mold cavities of the lower mold section. As the upper section closes down on the lower section the upper edge of the cutter blade 39 engages with the front side or edge of the upper mold section or die and trims off the surplus stock of candy at the front ends of the pieces of candy. The surplus stock is also trimmed off the rear end of the pieces of candy by means of upper and lower cutter blades 40, 41 which are secured lengthwise to the rear edges of the upper and lower mold sections respectively and are adapted, when these sections are closed, to engage each other edge to edge and remove the surplus stock of candy from the rear ends of the several pieces of candy. Each of the rear cutters is provided with a semicircular notch 42 which together with the companion notch of the other rear blade forms the opening which receives one of the skewers while the mold sections are closed and a skewer is inserted in the respective piece of candy. The opening of the skewer formed by the companion notches of the upper and lower rear blades is flared rearwardly or outwardly so as to form cutting edges at these notches on the blades and thereby sever the surplus candy from the rear end of the piece all around the skewer. By this means a neatly finished and uniform product is produced.

After the mass of candy has been formed into a plurality of pieces and the skewers have been inserted in the same the upper mold section or die is raised and the skewer rack is moved rearwardly, leaving the space above the lower mold section free to remove the finished product preparatory to placing another batch of plastic candy on the lower mold section and replacing the empty rack with another one filled with skewers.

Instead of operating the upper mold section and the rack carrier by the means shown in Figs. 1 and 3 to 6, this may be effected by any other suitable means such for instance as the means shown in Figs. 11 and 12 which comprise an upper horizontal crank shaft 43 having its cranks 48 connected by pitmen 44 with the cross head which carries the upper mold section, and upright rock levers 45 pivoted on the main frame and each engaging its other upper arm with a cam 46 on the crank shaft 43 while its lower arm is connected with one end of the skewer rack carrier by means of a connecting rod 47.

If it is desired to make pieces of candy without attaching skewers thereto all that is necessary is to omit placing a rack containing skewers on the slide 23 in which case a plurality of pieces of candy will be formed from a batch or mass of candy when die or mold sections close on the same, thereby rendering it possible to provide candy without skewers of any suitable design.

Although the finished pieces of candy may be removed from the lower mold or die section while the latter is in its horizontal normal position this may be effected quicker by taking hold of one or both handles 92 and turning the lower die and plate upwardly and forwardly into an inverted or reversed position, thereby permitting of discharging all of the pieces of candy from the lower die at one time into a receptacle provided for this purpose.

If desired, the lower platen which carries the lower die or section may be fixed either by forming the same integrally with the bench, as shown at 93 Figs. 11 and 12 or by securing the same thereto, in which case the lower platen or die cannot be reversed for dumping the pieces of candy out of the same.

We claim as our invention:

1. A candy machine comprising a mold having relatively movable sections provided with mold cavities adapted to form a piece of candy between them, cutters arranged on said sections at the corresponding ends of their mold cavities and adapted to trim off the ends of the sticks of candy, and means for inserting skewers into said sticks of candy, said skewers being separable from said inserting means.

2. A candy machine comprising a mold having relatively movable sections provided with mold cavities adapted to form a piece of candy between them, cutters arranged on said sections at the corresponding ends of their mold cavities and adapted to trim off the ends of the sticks of candy, and means for inserting skewers into said sticks of candy, the opposing edges of said cutters being notched to form openings between them for receiving said skewers.

3. A candy machine comprising a mold having relatively movable sections provided on their opposing sides with rows of mold cavities forming a plurality of pairs which are adapted to receive a mass of candy between them and divide the same into a plurality of pieces, a cutter blade arranged on one of said mold sections and adapted to engage with the corresponding edge of the other mold section, coöperating cutter blades arranged on said mold sections at the other corresponding edges of said mold sections and having notches in line with their mold cavities, and means for inserting skewers into said pieces of candy comprising a slide movable laterally relatively to said mold and having a plurality of sockets which receive said skewers and each of which is in line with one of said cavities.

4. A candy machine comprising a pair of mold sections which are relatively movable and provided on their opposing sides with coöperating mold cavities in which pieces of candy are formed, and means for inserting skewers in said pieces of candy comprising a reciprocating slide, and a rack removably mounted on the slide and adapted to support a plurality of skewers in line with said mold cavities, said rack having a wooden body provided with a plurality of sockets, and a metal strip closing the rear ends of said sockets.

5. A candy machine comprising a pair of mold sections which are relatively movable and provided on their opposing sides with coöperating mold cavities in which pieces of candy are formed, and means for inserting skewers in said pieces of candy comprising a reciprocating slide, and a rack removably mounted on the slide and adapted to support a plurality of skewers in line with said mold cavities, said rack having a wooden body provided with a plurality of sockets, a metal strip closing the rear ends of said sockets and a metal facing arranged on the front end of the body and provided with openings in line with said sockets.

6. A candy machine comprising a pair of mold sections which are relatively movable and provided on their opposing sides with coöperating mold cavities in which pieces of candy are formed, and means for inserting skewers in said pieces of candy comprising a reciprocating slide having a seat and a rack comprising a wooden body resting on said seat and having a plurality of sockets which are adapted to receive skewers and which are arranged in line with said mold cavities, a metal bottom strip arranged on said body at the rear ends of its sockets, and a backing block arranged between the bottom strip and the back of said seat.

Witness our hands this 9th day of October, 1911.

PETER H. SCHABACKER.
PETER H. SMITH.

Witnesses:
 THEO. L. POPP,
 ANNA HEIGIS.